Figure 1:
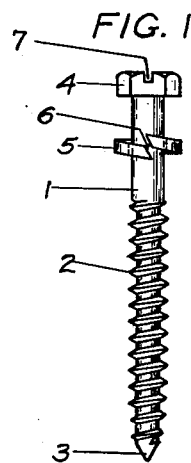

May 9, 1933.  J. BERGE  1,908,215

METHOD OF MAKING SCREW AND LOCK WASHER ASSEMBLIES

Filed Dec. 12, 1931

INVENTOR
JOSEPH BERGE
BY HIS ATTORNEY

Patented May 9, 1933                                                              1,908,215

UNITED STATES PATENT OFFICE

JOSEPH BERGE, OF MONTCLAIR, NEW JERSEY, ASSIGNOR TO THE NATIONAL LOCK WASHER COMPANY, OF NEWARK, NEW JERSEY

METHOD OF MAKING SCREW AND LOCK WASHER ASSEMBLIES

Application filed December 12, 1931. Serial No. 580,652.

This invention relates to the method of manufacturing a fastening device comprising a screw having smooth and threaded portions, and a split spring lock washer.

The principal object of the invention is to save time and labor in the overall manufacturing cost of the completed device and the handling thereof, both in shipping and particularly in the installation where the fastener is adapted for use.

Where screws and lock washers are shipped in separate packages and then assembled at the time of installation, much time is lost in taking the lock washers out of their package, and the screw or fastener out of its package and placing the washer on the screw or fastener, and in some assemblies, the washer frequently drops off the screw, thereby causing annoyance and further delay and expense.

My improvement will be readily understood by reference to the annexed drawing in which the single Figure 1 illustrates a completely assembled screw and washer. This assembly is obtained by first making the screw, having a smooth portion 1 and a threaded portion 2 terminating in an end 3, and having a head 4 which may be of any desired shape, a hexagonal shape being shown with a screw-driver slot 7 therein.

On many fasteners, the screw-threads 2 are usually rolled thereon so that the largest diameter of the screw-threads is greater than the diameter of the screw part 1. The split spring lock washer is formed of material having a carbon content, such that the washer will take a heat treatment, such as case-hardening or carburizing, or oil quenching, so that a spring tension may be given the washer. The fastener may or may not be made of material which will take the hardening processes above referred to.

However, in either case, the washer 5 is first made so that its internal diameter is slightly larger than that part of the screw over which it is passed to the smooth portion 1, as indicated in the drawing. After the washer has been put in place on the fastener, it is squeezed together around the smooth part 1 of the fastener so that the split edges are moved into normal unapplied pressure position as indicated by the space 6 which is intended to illustrate the spacing of a normal split spring tempered lock washer. The contraction of the washer on the smooth portion 1 of the fastener prevents the washer from dropping off the fastener, and the entire assembly is now given a treatment which will give the washer the necessary spring locking features common to lock washers in general. At the same time, the fastener will also be likewise treated, although as has been explained, the chemical structure of the fastener 1 may or may not be of a character to take on, to much extent, a hardening treatment.

After this operation has been performed on the assembled unit, the combination of the fastener and washer may be plated or otherwise given some external finish, and in the claims where it is specified that the assembly is "finish-treated", this is intended to cover the hardening treatment with or without the plating or other external finish being added thereto.

Having thus described my invention, what I claim is:

1. The method of manufacturing a fastening device comprising a screw having smooth and threaded portions, and a split spring lock washer; which consists in passing over the threaded part of the screw an untempered split spring washer having its internal diameter large enough so the washer will readily pass over the threaded part of the screw, then pressing the washer to move the split ends into overlapping unapplied pressure position and so the internal diameter is smaller than that part of the screw over which it has been passed, and then finish-treating both the screw and washer in their assembled position.

2. The method of manufacturing a fastening device comprising a screw having smooth and threaded portions, and a split spring lock washer; which consists in forming an untempered washer with the split ends separated more than in the finished washer, so the internal diameter is slightly greater than the threaded part of the screw, passing the washer over the threaded part of the screw, then squeezing the washer around the smooth part of the screw, whereby the split ends pass into normal unapplied pressure position, and then finish-treating the whole assembly.

3. The method of manufacturing a fastening device comprising an assembled screw and washer, the screw having smooth and threaded portions, the smooth portion being of smaller diameter than the outer diameter across the threads; which consists in making an untempered split washer having an internal diameter greater than the threaded part of the screw, passing the washer over the threaded part of the screw, then squeezing the split ends of the washer toward each other around the smooth part of the screw, thereby preventing thereafter, the washer from dropping off the screw, and then finish-treating the whole assembly.

In testimony whereof, I affix my signature.

JOSEPH BERGE.